United States Patent [19]

Salemme

[11] 4,032,309
[45] June 28, 1977

[54] PREPARATION OF MICROPOROUS POLYCARBONATE RESIN MEMBRANES

[75] Inventor: Robert M. Salemme, Schenectady, N.Y.

[73] Assignee: General Electric Company, Schenectady, N.Y.

[22] Filed: Apr. 16, 1976

[21] Appl. No.: 677,716

Related U.S. Application Data

[63] Continuation-in-part of Ser. No. 456,970, April 1, 1974, abandoned.

[52] U.S. Cl. .............................. 55/158; 260/2.5 M; 264/41; 264/216
[51] Int. Cl.² ................. B01D 13/04; B01D 31/00; B01D 39/16; B29D 27/04
[58] Field of Search ......... 264/41, 216; 210/500 M; 55/16, 158; 260/2.5 M

[56] References Cited

UNITED STATES PATENTS

| 3,256,675 | 6/1966 | Robb ..................................... 55/16 |
| 3,526,588 | 9/1970 | Michaels et al. .......... 210/500 M X |
| 3,615,024 | 10/1971 | Michaels .................. 210/500 M X |
| 3,767,737 | 10/1973 | Lundstrom ...................... 55/158 X |
| 3,852,388 | 12/1974 | Kimura ..................... 210/500 M X |

OTHER PUBLICATIONS

Manjikian, S.; S. Loeb; and J. W. McCutchan, "Improvement In Fabrication Techniques for Reverse Osmosis Desalination Membranes," *First International Symposium on Water Desalination,* Oct. 3–9, 1965, Washington, D.C., SWD/12, pp. 1–3, 13.

U.S. Office of Saline Water, Research and Development Progress Report No. 359, Oct. 1968, "Development of New Reverse Osmosis Membranes for Desalination," by L. T. Rozelle, et al., Washington, D.C., U.S. Dept. of Interior, p. 48.

Kirk–Othmer, *Encyclopedia of Chemical Technology,* Second Completely Revised Edition, Sections, "Polycarbonates," by H. Schnell, vol. 16, New York, Interscience, c 1968, pp. 106–116.

*Primary Examiner*—Philip Anderson
*Attorney, Agent, or Firm*—Leo I. MaLossi; Joseph T. Cohen; Jerome C. Squillaro

[57] ABSTRACT

A casting process is set forth for the preparation of microporous membranes from polycarbonate resin material. The polycarbonate resin is dissolved in an organic casting solvent to produce a solution stable at room temperature. The solution is cast as a thin film on a smooth substrate and is permitted to desolvate for at least a few seconds. Film and substrate are immersed in a bath characterized by the capabilities for swelling the polycarbonate resin, and for dissolving the first solvent, while not dissolving the polycarbonate resin. After formation of the film is initiated, the film and substrate are removed from the quenching bath and the film is either water-washed or air dried to attain the full mechanical strength thereof.

12 Claims, No Drawings

PREPARATION OF MICROPOROUS POLYCARBONATE RESIN MEMBRANES

BACKGROUND OF THE INVENTION

This is a continuation-in-part of U.S. patent application Ser. No. 456,970 — Salemme, filed Apr. 1, 1974 and now abandoned.

The preparation of polycarbonate resins and the use thereof for the preparation of thin non-porous films used for gas separation is disclosed in U.S. Pat. No. 3,256,675 — Robb, incorporated herein by reference. Since polycarbonate resin is available in commerce, e.g., by the General Electric Company under the registered trademark of "Lexan", there appears to be no need for describing herein various methods for the preparation thereof.

The preparation of porous and anisotropic membranes by two different methods are described in U.S. Pat. No. 3,615,024 — Michaels and U.S. Pat. No. 3,709,774 — Kimura. Among the various film-forming polymers utilized in each patent is polycarbonate resin.

Both Michaels and Kimura utilize the general procedure of preparing a casting solution of the polymer, casting a film thereof on a smooth substrate and immersing the substrate and film in an appropriate quenching bath for the development of asymetric structural characteristics of the completed film.

These methods differ from each other in the manner in which some of the process steps are conducted. While the Michaels patent is particularly directed to the preparation of a membrane having a microporous support layer and an integral microporous skin, Kimura is primarily interested in a film structure presenting a porous region adjacent a very thin dense non-porous layer. Kimura specifically teaches the preparation of a casting solution consisting of the polymer and two mutually miscible solvents in which the polymer is soluble to substantially different degrees. Both the Michaels and Kimura methods view the immersion (or membrane-forming) bath as one, which functions as a solvent for the casting solution solvent system, functioning thereby solely to remove casting solution solvent from the film structure.

The instant invention differs from both the aforementioned methods in that it is specific to the formation of microporous, substantially isotropic polycarbonate resin membranes in a commercially feasible process neither suggested nor contemplated in either of the of the aforementioned patents.

The following terms employed in reference to the instant invention whether in the written description or in the appended claims shall be defined as follows:

A "good" solvent for a polycarbonate resin is one in which at room temperature (about 20°–35° C.) and pressure (atmospheric) at least 10 grams of polycarbonate resin can be dissolved in 100 milliliters of the solvent. A preferred "good" solvent is one in which at least 20 grams of polycarbonate resin can be dissolved in 100 milliliters of the solvent at room temperature and pressure. Good solvents may, of course, be used in combination (e.g., mixtures of chloroform and methylene chloride).

The term "casting solvent" is limited to a solvent system composed only of one or more good solvents. This requirement, of course, excludes the introduction of swelling agents (i.e., materials that cause swelling of the resin without causing significant dissolution) for polycarbonate resin, since such materials would not qualify as good solvents. The importance of excluding swelling agents from the casting solution is set forth below.

The term "porosity" as employed herein is (for a given area of film) the ratio of the area in the given film area occupied by holes to the total of the given area of film. A porosity of at least 50% is considered good porosity while a porosity of 25% of less is considered poor in view of the economics of passing gas through the porous film.

A casting solution is considered "stable" herein if no gelling or precipitation of polymer occurs in a period of at least seven days.

DESCRIPTION OF THE INVENTION

Polycarbonate resin is dissolved in a casting solvent (defined hereinabove) to form a casting solution, some of this casting solution is spread as a thin clear film over a smooth substrate (e.g., a glass plate) and is permitted to desolvate for a controlled period of time ranging from a few seconds to as much as one minute or more depending upon the vapor pressure of the good solvent(s) employed and the desired pore size in the completed film. The cast film (colorless) and substrate are immersed in a quenching bath, which must be capable both of swelling the polycarbonate resin and of simultaneously dissolving the casting solvent from the developing film, while not dissolving the polycarbonate resin. Shortly after immersion, the film structure begins to form as the liquid of the quenching bath enters the film. Thereupon the film becomes white and opaque. At this point the developing membrane is not attached to the plate and can be separated therefrom. However, the membrane is usually still too weak to handle and the support of the substrate is required to remove the membrane from the quenching bath. Thereafter the full mechanical strength of the film is attained either by water washing or air drying.

When water washing is used, the membrane floats to the top of the bath. In a very short time the water leaches out the casting solvent/quenching bath content of the membrane, the membrane acquires mechanical strength and may now be handled for removal, drying and use, i.e., for the support of an ultrathin non-porous membrane useful for separting gases. Polycarbonate resin microporous support membranes as prepared by the method of this invention are particularly advantageous, because of the hydrophobic, dimensionally stable nature thereof. In addition, both the cost of manufacture and the mechanical properties of these microporous polycarbonate resin membranes compare very favorably with these aspects of commercially available membrane material suitable for the same use (support for ultrathin gas separation membranes).

In the case of drying of the membrane (as removed with the support from the quenching bath) in air, in other gas, or in a vacuum, sufficient drying time must be permitted to evaporate the casting solvent quenching bath content of the membrane. As this evaporation is accomplished and the membrane dries it achieves its mechanical strength, can be handled and is ready for use.

The extent of desolvation of the newly cast film and changes in the particular immersion, or quenching, bath composition may each be employed as a control mechanism for determining the pore size in the completed film. Desolvation time may range from a few seconds (almost immediate immersion of the cast film) to about 45 seconds with a polycarbonate resin solvent having a vapor pressure near that of chloroform. The desolvation time may range even higher, when casting solvents having vapor pressure lower than the vapor pressure of chloroform are employed. As a practical matter, the shorter the desolvation time required for the production of a membrane having the desired characteristics of porosity and mechanical strength, the better, as both the processing time and the capital investment are decreased.

The usual time required in the quenching bath is less than one minute, however, longer quenching periods may be required for particular casting solvent/quench bath systems.

MANNER AND PROCESS OF MAKING AND USING THE INVENTION

Contrary to the Kimura process, the instant invention does not employ a three-component (resin, good solvent, poor solvent) casting solution and, in contrast to both Kimura and Michaels, the instant invention utilizes an immersion (quenching) bath to initiate formation of the film that must provide a function neither disclosed nor contemplated in either Kimura or Michaels; namely, causing swelling of the polycarbonate resin material at the same time as the casting solvent is removed from the film thereby.

Following the general teachings in the Michaels' specification (column 3, lines 6-19), which specify only "a high degree of miscibility with said organic solvent and a sufficiently low degree of compatibility with said casting dope" as required capabilities for the "diluent" (i.e., quenching bath), chloroform was utilized as the casting (i.e., primary) solvent and methanol (non-solvent for polycarbonate resin and solvent for chloroform) was selected as the quenching bath. When films were cast utilizing methanol alone as the quenching bath, the resulting polycarbonate films were non-porous.

Following the further suggestion in Michaels (column 10, lines 15-24), the quenching bath was modified by adding chloroform (the primary solvent) to the methanol bath. When equal volumes of chloroform and methanol were employed as the quenching bath, a porous, but discontinuous, polycarbonate film resulted. Changing the proportions of these liquids so that more chloroform was present relative to the methanol content, the polycarbonate film became even more discontinuous. When less chloroform was used relative to the methanol content, a film of adequate mechanical strength resulted, but the film was non-porous.

An attempt was made to modify the polycarbonate resin/chloroform casting solution (in accordance with the Kimura teachings) by the addition thereto of a poor (relative to chloroform) solvent, dimethylformamide (DMF). DMF is also a material that causes swelling of polycarbonate resin. Using methanol alone as the quenching bath, a film of the aforementioned three-component casting solution was cast upon a glass plate and almost immediately thereafter plate and film were immersed in the quenching bath. After water-washing, a porous polycarbonate resin membrane of good mechanical strength was recovered. Because this appeared to be a successful method, evaluation of the casting method was extended, whereupon it was discovered that the addition of the third component (DMF) to the polycarbonate resin/chloroform casting solution destroyed the stability of the two-component system. Thus, while the previous two-component system (polycarbonate resin and chloroform) had been stable at room temperatures (i.e., about 20°-35° C.) for long periods of time, gelling of the three-component solution (one of which is a swelling agent) casting solution occurred in a very short period of time (as little as 10 minutes). This propensity to gelling of the casting solution upon the inclusion of a swelling agent therein presents a serious obstacle to the use of such a modified casting solution in any industrial-scale process for the preparation of polycarbonate resin membranes. A non-stable casting solution could only be prepared in small quantities increasing the expense and the lack of uniformity of the casting process.

In order to determine the extent to which this propensity to gelling would prevail upon adding another component (i.e., the "poor" solvent, also a swelling agent) to the casting solution in addition to the polymer and the "good" solvent, a number of combinations were investigated. Unless otherwise noted, the casting solution prepared contained 20 grams of polycarbonate resin per 100 milliliters of "good" solvent. The casting solutions were prepared and maintained at prevailing conditions (i.e., room temperature and pressure). No stable polycarbonate resin casting solution was found, which incorporated a swelling agent and, when cast, produced microporous membranes. The swelling agent components added are as follows: toluene, dimethylformamide (DMF), dimethylacetamide (DMAc) and 1,4-dioxane. Effects of the swelling agents on otherwise stable casting solutions are set forth in TABLE I below.

TABLE I

| | | |
|---|---|---|
| 1. | 25 ml Lexan/CHCl$_3$<br>25 ml toluene | gelled* |
| 2. | 25 ml Lexan/CHCl$_3$<br>12.5 ml toluene | gelled* |
| 3. | 25 ml Lexan/CHCl$_3$<br>25 ml DMF | gelled in 15 minutes |
| 4. | 25 ml Lexan/CHCl$_3$<br>12.5 DMF | gelled in less than 1 hour |
| 5. | 25 ml Lexan/CHCl$_3$**<br>10 ml DMF | gelled in less than 1 hour |
| 6. | 25 ml Lexan/CHCl$_3$<br>5 ml DMF | gelled* |
| 7. | 25 ml Lexan/CHCl$_3$<br>2.5 ml DMF | gelled* |
| 8. | 25 ml Lexan/CH$_2$Cl$_2$<br>25 ml DMF | gelled* |
| 9. | 25 ml Lexan/CH$_2$Cl$_2$<br>10 ml DMF | gelled* |
| 10. | 15 ml Lexan/CHCl$_3$<br>15 ml Lexan/CH$_2$Cl$_2$<br>15 ml DMF | gelled* |
| 11. | 15 ml Lexan/CHCl$_3$<br>15 ml Lexan/CH$_2$Cl$_2$<br>30 ml DMF | gelled* |
| 12. | 25 ml Lexan/CH$_2$Cl$_2$<br>17 ml DMAc | gelled* |
| 13. | 25 ml Lexan/CH$_2$Cl$_2$<br>12.5 ml DMAc | gelled* |
| 14. | 25 ml Lexan/CHCl$_3$<br>12.5 DMAc | gelled in less than 10 minutes |
| 15. | 25 ml Lexan/CHCl$_3$<br>12.5 ml 1,4-dioxane | gelled* |

*The solution stood overnight and was found in the gelled condition the next morning.
**10 grams Lexan per 100 ml CHCl$_3$.

Concluding that modification of the casting solution (as is taught in Kimura and Michaels) could not provide a viable commercial process for casting microporous polycarbonate resin films, those teachings were set aside and an experiment was conducted in which a stable two-component casting solution (polycarbonate resin dissolved in chloroform) was cast, almost immediately quenched in a bath (equal volumes of methanol and DMF) and then water-washed. The resulting polycarbonate resin membrane was not only microporous, but possessed good mechanical properties. Thus, by introducing an additional capability into the quenching bath (i.e., the capability for swelling the polycarbonate resin during the formative stages of the membrane) a room temperature-stable casting solution could be used and a serious obstacle to the development of a viable industrial process removed.

The following references were among those referred to for information on solvents for polycarbonate resin:
1. Christopher, W. F., & Fox, D. W., Polycarbonates, Reinhold Publishing Corp., N.Y. pp 31–33 and
2. Schnell, H., Chemistry and Physics of Polycarbonates, Interscience Publishers, pp 99–101.

A number of solvents were selected for determination of the stability characteristics of polycarbonate/casting solvent casting solution prepared therefrom. In each instance, it was attempted to dissolve 20 grams of polycarbonate resin in 100 milliliters of the solvent at room temperature and the resulting solutions were permitted to stand at room temperature to determine the stabilities thereof. The results are set forth in TABLE II hereinbelow (except as noted all of the polycarbonate resin dissolved):

TABLE II

| 1. | chloroform | still stable months after preparation |
| 2. | methylene chloride | still stable months after preparation |
| 3. | trichloropropane | gelled before all resin dissolved |
| 4. | trichloroethylene | gelled before all resin dissolved |
| 5. | 1,1,1-trichloroethane | gelled before all resin dissolved |
| 6. | 1,1,2,2-tetrachloroethane | still stable 15 days after preparation |
| 7. | cis-1,2-dichloroethylene* | stable 15 days after preparation |
| 8. | m-cresol** | stable 15 days after preparation |
| 9. | cyclohexanone | gelled before all resin dissolved |

*The solution was saturated.
**The solution was saturated with much excess polycarbonate.

The 1,1,1-trichloroethane and cyclohexanone samples were each diluted with an additional 100 ml of solvent but the gel did not dissolve. Routine experimentation will suffice to determine what other casting solvents will form stable casting solutions with polycarbonate resin.

Thereafter, each of the more promising polymer/solvent systems from TABLE II was utilized in the casting of polycarbonate resin films. In each case a 10 mil thick layer of polymer solution was cast on a glass plate. The plate and film were almost immediately (i.e., only several seconds of air drying) submerged in a mixture of equal volumes of methanol and DMF. When the membrane had equilibrated (completion of the interchange of casting solvent leaving the film and methanol/DMF entering the film), the plate and membrane were transferred to a water wash bath. In each instance the casting solution contained 20 grams of polycarbonate per 100 milliliters of solvent except where otherwise noted. The results are set forth in TABLE III.

TABLE III

| Solvent | Result |
| --- | --- |
| chloroform | good quality |

TABLE III-continued

| Solvent | Result |
| --- | --- |
| | porous film |
| methylene chloride* | porous, but poor quality film |
| 1,1,2,2-tetrachloroethane | very slightly porous |
| cis-1,2-dichloroethylene | porous film |
| m-cresol** | too weak to examine |

*Casting thickness = 20 mil.
**A saturated solution at room temperature contained much less than 20 gm of polycarbonate per 100 ml of solvent.

A number of liquids were investigated for use thereof in the quencing bath. When these materials were individually used, it was found that in each instance (except for acetone) a non-porous polycarbonate film resulted. Other than water, all of the quenching liquids investigated are solvents for chloroform ($CHCL_3$). In each instance (both when individual quenching liquids were employed and when quenching liquids in various combinations were employed) the casting solution was prepared by dissolving 20 grams of polycarbonate resin in 100 milliliters of chloroform. Casting was done on a glass plate and unless otherwise indicated, the thickness of the cast film was 10 mils. All work was done at prevailing conditions (i.e., room temperature and pressure), however, this is not a limitation of the process. The various quenching liquids investigated are set forth in TABLE IV together with an indication of the properties of these liquids as non-solvents for polycarbonate resin and/or as polycarbonate resin swelling agents.

TABLE IV

| methanol | non-solvent for polycarbonate resin |
| $H_2O$ | non-solvent for polycarbonate resin |
| ethylene glycol | non-solvent for polycarbonate resin |
| N-hexane | non-solvent for polycarbonate resin |
| acetone | swelling agent (non-solvent for polycarbonate resin) |
| toluene | swelling agent (non-solvent for polycarbonate resin) |
| 1,4-dioxane | swelling agent (very poor solvent for polycarbonate resin) |
| dimethylformamide | swelling agent (poor solvent for polycarbonate resin) |

EXAMPLE 1 (Quenching bath-acetone)

The polycarbonate resin solution was cast as a film, almost immediately quenched and then water-washed. The resulting membrane was porous and exhibited reasonably good mechanical properties. This was the only liquid investigated found to be useable individually.

EXAMPLE 2 (Quenching bath — ethylene glycol)

The operational sequence of Example 1 was repeated. The polycarbonate membrane produced was continuous, but not porous.

EXAMPLE 3 (Quenching bath — N-hexane)

The operating sequence of Example 1 was repeated and resulted in a good quality film that was not porous.

EXAMPLE 4 (Quenching bath — toluene)

The polycarbonate solution was cast as a film, almost immediately quenched and then air dried. The resulting film was too weak to pressure test.

Attempts to use individual quenching baths of 1,4-dioxane and of DMF were unsuccessful due to the slight solubility of polycarbonate resin in these liquids.

Combinations of quenching liquids were investigated. It was verified that the quencing bath must (as is the case with acetone) exhibit the capability for leaching solvent from the cast film and also the capability of swelling polycarbonate resin, while of course not dissolving the polycarbonate resin from the cast film. The casting solution and conditions were the same as in the preceding examples. Film thickness (as cast) was 10 mils (unless otherwise noted) cast on a glass plate. In the following examples the assessments that have been made as to surface quality would be those of concern if the intended use for the membrane is to be a support for an ultrathin polymer membrane.

EXAMPLE 5 (Quenching bath — equal volumes of methanol and chloroform)

a. The polycarbonate solution was cast as a film, almost immediately quenched and then water washed. The result was a poor discontinuous film.

b. The polycarbonate solution was cast as a film, almost immediately quenched and then air dried in order to remove more of the chloroform solvent than in (a). The resulting film was slightly porous but exhibited poor mechanical qualitites " many holes, thin spots and lacy areas.

EXAMPLE 6 (Quenching bath — 1 volume of methanol to 2 volumes of chloroform)

The operating sequence of Example 5(b) was repeated. The resulting membrane had not properly desolvated and many discontinuities were observed in the film — very poor mechanical properties.

EXAMPLE 7 (Quenching bath — 2 volumes of methanol to 1 volume of chloroform)

a. The operating sequence of Example 5(a) was repeated. The result was a poor, discontinuous film.

b. The operating sequence of Example 5(b) was repeated. A continuous film exhibiting good mechanical qualities was produced, but this film was not porous.

EXAMPLE 8 (Quenching bath — equal volumes of methanol and chloroform; film was cast 15 mils thick)

The operating sequence of Example 5(a) was followed. The resulting film was even worse than the 10 mil thick film cast utilizing the same bath composition. Large discontinuous areas and much surface roughness was observed.

EXAMPLE 9 (Quenching bath — 1 volume of methanol to 1 ½ volumes of chloroform)

The operating sequence of Example 5(a) was repeated. The resulting film had many holes therein — not useful.

EXAMPLE 10 (Quenching bath — 1 one volume of water to 10 volumes of methanol)

The sequence of steps used in Example 5(a) was followed. The resulting film was nearly transparent and was not porous.

EXAMPLE 11 (Quenching bath — 2 volumes of water to 10 volumes of methanol)

The same procedure was followed as in Example 5(a) and resulted in a transparent, non-porous film.

EXAMPLE 12 (Quenching bath — 1 volume of water to 2 volumes of methanol)

The procedure for Example 5(a) was repeated. A continuous membrane did not form, because chloroform is not sufficient soluble in this quencing mixture.

EXAMPLE 13 (Quenching mixture — 1 volume of water to 1 volume of DMF)

The procedure of Example 5(a) was followed and resulted in a membrane with very poor mechanical strength that formed slowly in the quenching bath. The membrane was too weak to measure the porosity thereof.

EXAMPLE 14 (Quenching mixture — 1 volume of water to 2 volumes of DMF)

The procedure in Example 5(a) was followed and resulted in a film of poor quality with holes and rough exposed surface. Where a sound portion of film could be recovered and tested, this portion was found to be porous.

EXAMPLE 15 (Quenching mixture — 1 volume of water to 4 volumes of DMF)

The procesure of Example 5(a) was followed. The resulting film was of poor quality (holes, streaks, alligator skin), but was better than in Example 14. A sound portion of the film was tested and was porous.

EXAMPLE 16 (Quenching mixture — 1 volume of water to 9 volumes of DMF)

The procedure of Example 5(a) was followed and resulted in an even better membrane. However, the resulting porous film still had pin holes, streaks and surface roughness. The glass side was smooth and shiny.

EXAMPLE 17 (Quenching bath — 1 volume of methanol to 2 volumes of toluene)

The operating sequence of Example 5(b) was followed. The resulting membrane was porous, but exhibited a certain degree of brittleness, after drying.

EXAMPLE 18 (Quenching solution — equal volumes of methanol and toluene)

The operational sequence of Example 5(b) was repeated and resulted in a porous film having good mechanical properties.

EXAMPLE 19 (Quenching bath — equal volumes of methanol and dioxane)

The operating sequence of Example 5(a) was repeated and a porous film of good mechanical properties resulted.

EXAMPLE 20 (Quenching bath — 2 volumes of methanol to 1 volume of dioxane)

The procedure of Example 5(a) was repeated resulting in a good quality film that was non-porous.

EXAMPLE 21 (Quenching bath — equal volumes of methanol and acetone)

The procedure of Example 5(a) was followed and resulted in a non-porous good quality strong film.

EXAMPLE 22 (Quenching bath — 1 volume of methanol to 2 volumes of acetone)

The procedure of Example 5(a) was repeated resulting in a porous film of good mechanical properties.

EXAMPLE 23 (Quenching bath—equal volumes of water and acetone)

The procedure of Example 5(a) was repeated producing a discontinuous, weak membrane.

EXAMPLE 24 (Quenching bath — 1 volume of water to 2 volumes of acetone)

The procedure of Example 5(a) was repeated resulting in a membrane having a very irregular surface having many pock marks therein. The membrane was porous.

EXAMPLE 25 (Quenching bath — 1 volume of water to 3 volumes of acetone)

a. The procedure of Example 5(a) was repeated producing a slightly porous membrane exhibiting good mechanical properties.

b. The procedure of Example 5(b) was repeated. The resulting membrane was slightly porous and exhibited good mechanical properties.

EXAMPLE 26 (Quenching bath — equal volumes of water and dioxane)

The procedure of Example 5(a) was repeated. No membrane was produced, because the cast film did not desolvate (i.e., the chloroform did not leave the film).

Thus, the only useful single component quenching bath was acetone, which exhibits the properties of being a non-solvent, swelling agent for polycarbonate resin and a solvent for chloroform. Further, an acetone bath should be useful whenever the casting solvent is soluble therein. Useful multicomponent quenching baths are the following: methanol and acetone; methanol and toluene; methanol and dioxane and methanol and DMF. Other quenching baths of use in this invention with preselected casting solvents may be determined by routine experimentation using the guidelines set forth herein.

The effect of desolvation time and the thickness in which the film is cast on porosity are illustrated in the following examples:

EXAMPLE 27

A film was cast on a glass plate from 20% (wt/vol) polycarbonate resin/$CHCl_3$ casting solution using a 15 mil blade setting. The glass plate and film quickly immersed in a equivolume mixture of methanol and DMF. The resulting white film was very weak (but continuous). The film (on the plate) was then transferred to a water wash and became much stronger as the methanol and DMF were leached out. The film was air-dried. The thickness was determined to be about 7 mils in thickness and the film was porous.

EXAMPLE 28

The procedure of Example 27 was repeated with a change in film thickness to 10 mils (as cast). The resulting film was 4.5 mil thick with good porosity (about 50%) and exhibiting good mechanical properties.

EXAMPLE 29

A film was cast as in Example 27. It was desolvated for 15 seconds before being quenched in the bath. The film was porous with a thickness of about 6 mils and had good mechanical properties.

EXAMPLE 30

A 10% (wt/vol) polycarbonate resin/$CHCl_3$ solution was prepared and was cast in a 15 mil thickness on a glass plate. The film supported on the plate was immersed almost immediately and the resulting membrane was not continuous, presumably, because not enough polymer was present in the 10 mil thick film as cast.

The conclusion of the quenching solution was changed to 2 volumes of methanol to one volume of DMF for the following example.

EXAMPLE 31

A 20% (wt/vol) polycarbonate resin/$CHCl_3$ solution was cast on a glass plate in a 10 mil thickness. The film was quickly quenched. After water washing, a 4 mil thick membrane was produced having good mechanical properties, but was less porous than the membrane produced in Example 28.

The quenching bath composition was changed to one volume of methanol to four volumes of DMF for the following examples.

EXAMPLE 32

A 20% (wt/vol) polycarbonate resin/$CHCl_3$ solution was cast at 10 mil blade setting and was almost immediately quenched. The plate with film thereon was transferred to a water bath. After water washing the membrane produced (about 4.5 mils thick) was strong enough to be handled, was porous, but was weak and brittle.

The quenching bath composition was changed to one volume of methanol to two volumes of DMF for the following example.

EXAMPLE 33

The procedure in Example 32 was repeated. The film floated from the plate in the water bath and was strong enough to handle. The dried film was about 4.5 mils thick and was porous but its mechanical strength was not as good as in Example 28.

As is indicated by the variation in results made possible with the changes in concentration of the polycarbonate resin solution, casting thickness, the desolvation period and the quenching bath composition, the optimization of porosity with a trade-off in mechanical properties is to be expected and is readily determinable for a given casting solution/quenching bath system. Thus, good membranes having porosities of greater than 70% are expected upon optimization of the above variables.

Scanning electron micrographs taken of the edges of membranes prepared according to this invention as disclosed showed the membranes to be substantially isotropic, and not asymmetric.

BEST MODE CONTEMPLATED

The preferred mode for the practice of this invention should be related to the specific use for the membrane.

Thus, for use as a support for an ultrathin membrane the porosity and surface characteristics are critical. To produce a membrane for this use it is preferred to dissolve 20 gms of Lexan polycarbonate resin in 100 ml of chloroform at room temperature and pressure. This casting solution has been found to be stable for an indefinite period (greater than three months) of time.

Film thickness (cast upon a glass plate) will vary from about 5 to about 15 mils with a preferred casting thickness of about 10 mils to produce a 3 mil thick microporous membrane for use as a support for an ultrathin non-porous polymer gas exchange membrane. The desolvation time is kept short, the cast film being immersed in the quenching bath (equal volumes of methanol and DMF) almost immediately after casting has been completed. After equilibration (5–60 seconds), the membrane and support are transferred to the water-wash, where the membrane floats free and its mechanical properties quickly develop. Thereafter, the membrane can be handled, dried and used.

The terms "room temperature" and "room pressure" as used in the specification and in the appended claims means the conditions of temperatures and pressure prevailing in the ambient in which a given determination is made or process step(s) is conducted, i.e., there is no application or withdrawal of heat from the designated material or process step different from that occurring in the ambient. Ordinarily room temperature is in the range of about 20°–35° C. and room pressure is atmospheric.

What I claim as new and desire to secure by Letters Patent of the United States is:

1. A method for the preparation of porous polycarbonate resin membranes comprising the steps of:
   a. preparing a casting solution at room temperature consisting of polycarbonate resin material and a casting solvent composed of one or more good solvents, said casting solution being stable at room temperature,
   b. casting a layer of the casting solution so formed on a smooth, clean surface of supporting means,
   c. permitting desolvation to occur for a predetermined time interval from said layer,
   d. immersing said layer and supporting means in a quenching bath liquid, said quenching bath liquid having the capabilities for dissolving said casting solvent and for causing swelling of the polycarbonate resin content of said layer while being a non-solvent for the polycarbonate resin, said immersion step initiating formation of a microporous membrane by entry of the quenching bath liquid into said layer and exit of casting solvent therefrom.
   e. removing said microporous membrane from said quenching bath and
   f. removing the remaining casting solvent and quenching bath liquid from said microporous membrane.
2. The method of claim 1 wherein the casting solvent is chloroform.
3. The method of claim 2 wherein the quenching bath liquid is a mixture of methanol and dimethylformamide.
4. The method of claim 3 wherein the methanol and dimethylformamide are mixed in equal volumes.
5. The method of claim 1 wherein the quenching bath liquid is a mixture of methanol and dimethylformamide.
6. The method of claim 1 wherein the quenching bath liquid is acetone.
7. The method of claim 1 wherein the quenching bath liquid is a mixture of methanol and toluene.
8. The method of claim 1 wherein the quenching bath liquid is a mixture of methanol and dioxane.
9. The method of claim 1 wherein the remaining casting solvent and quenching bath liquid is removed from the membrane in a water bath.
10. The method of claim 1 wherein the remaining casting solvent and quenching bath liquid is removed from the membrane by evaporation.
11. The method of claim 1 wherein a non-aqueous quenching bath liquid is employed.
12. The substantially isotropic microporous polycarbonate resin membrane produced by the process of claim 1.

* * * * *